United States Patent [19]
Hitzman

[11] 4,446,919
[45] May 8, 1984

[54] ENHANCED OIL RECOVERY USING MICROORGANISMS

[75] Inventor: Donald O. Hitzman, Bartlesville, Okla.

[73] Assignee: Phillips Petroleum Company, Bartlesville, Okla.

[21] Appl. No.: 371,770

[22] Filed: Apr. 26, 1982

[51] Int. Cl.³ .............................................. E21B 43/22
[52] U.S. Cl. .................................. 166/246; 166/273; 166/274; 435/281
[58] Field of Search .............. 166/246, 273, 274; 435/281

[56] References Cited

U.S. PATENT DOCUMENTS

| | | |
|---|---|---|
| 2,623,596 | 12/1952 | Whorton et al. ................... 166/274 |
| 2,641,566 | 6/1953 | ZoBell ................................. 435/281 |
| 2,660,550 | 11/1953 | Updegraff et al. ................ 166/246 |
| 2,807,570 | 9/1957 | Updegraff ........................... 166/246 |
| 3,084,743 | 4/1963 | West et al. ..................... 166/274 X |
| 3,185,216 | 5/1965 | Hitzman ............................. 166/246 |
| 3,332,487 | 7/1967 | Jones .................................. 166/246 |
| 3,340,930 | 9/1967 | Hitzman ............................. 166/246 |

*Primary Examiner*—Stephen J. Novosad

[57] ABSTRACT

A post-primary oil recovery process is provided in which carbon dioxide-tolerating microorganisms are injected into an oil-bearing subterranean formation and feed on nutrients which are extracted from the oil by carbon dioxide injected and maintained under a pressure of at least about 500 psig. The products of microorganism growth enhance petroleum recovery from the formation.

15 Claims, No Drawings

ENHANCED OIL RECOVERY USING MICROORGANISMS

BACKGROUND OF THE INVENTION

The invention relates to oil production. In one aspect, the invention relates to a post-primary oil recovery process using microorganisms. The invention in another aspect relates to a $CO_2$ drive in a post-primary oil recovery process.

Petroleum is recovered from underground oil-bearing reservoirs by penetrating the reservoir with one or more wells and permitting the oil to flow to the surface or pumping it to the surface through the wells. When there is sufficient pressure available in the form of an underlying active water drive, gas dissolved in the petroleum, or a high-pressure gas cap over the petroleum, this naturally-present force can be exploited to force the petroleum to the surface. When the reservoir does not have this natural pressure or when it is depleted by recovery of a portion of the oil and gas in the reservoir, oil will not flow naturally to the surface and methods must be devised to recover this residual oil supply. The recovery of oil using the natural reservoir pressure is called primary recovery. Methods of post-primary recovery have been developed to supply additional pressure to force remaining oil to the producing well or to reduce the forces tending to prevent the flow of oil through the reservoir.

One such method of post-primary oil recovery involves the use of surface active agents to decrease the oil-water surface tension. Such surface active agents can be injected into the formation or, under suitable conditions, can be formed in the reservoir itself. One method of forming surfactants in situ is to inject microorganisms which release surface active substances as metabolic products. The nutrients for the organisms must be supplied to the formation. One method for supplying nutrients for the microorganisms is to inject a nutrient-rich substance such as molasses and, in some cases, nitrogen and sulfur containing compounds into the formation. Such a process is disclosed in U.S. Pat. No. 2,807,570 issued to Updegraff on Sept. 24, 1957. The disadvantages of such a process include its high cost and the tendency of the molasses, and therefore microbial growth, to be concentrated near the injection well and not distributed evenly throughout the formation. This results in uneven distribution of microorganism life and surfactant activity within the reservoir and provides an inefficient method of in situ surfactant preparation.

It is thus an object of the invention to provide a post-primary oil recovery process. It is a further object to provide a method of in-situ surfactant production using microorganisms. In one of its aspects, the invention has as its object to provide oil-derived nutrients for microorganisms used in post-primary oil recovery processes.

SUMMARY OF THE INVENTION

According to the invention, microorganisms for use in a post-primary oil recovery process are injected into an oil-containing subterranean reservoir in combination with high-pressure carbon dioxide gas. The carbon dioxide gas extracts nutrients from the reservoir oil. The microorganisms feed on the nutrient-rich extracts and produce extracellular products which act as surfactants to release oil from the reservoir. The microorganisms can be injected prior to, subsequent to or contemporaneous with the injected carbon dioxide.

The method of the invention has several advantages over the prior method of in situ subterranean microorganism feeding. The carbon dioxide which is used to extract nutrients from the oil also acts as a solubilizing agent for the thus-removed substances, providing a "balanced diet" for the organisms. The pressured carbon dioxide extracts nitrogen-containing compounds from oil. The nitrogen-containing materials supply the necessary nitrogen for growth of the organisms. The extracted nitrogen-containing compounds also have surfactant properties for reducing the interfacial tension between the oil phase and the aqueous medium of the microorganisms. As the microorganisms grow they produce extracellular products such as methane, organic acids, biopolymers, solvents and carbon dioxide. The carbon dioxide provides anaerobic conditions for microorganism growth and pressure for driving the organism front through the formation. In addition, the pressured carbon dioxide reduces the viscosity of the oil in place by extracting high molecular weight compounds from it. As the microorganisms grow, they produce extracellular additional carbon dioxide and replenish carbon dioxide lost to the reservoir.

DETAILED DESCRIPTION OF THE INVENTION

In the oil recovery process of the invention, a carbon dioxide-tolerating microorganism is injected, preferably in aqueous solution, into an oil-bearing subterranean reservoir. The suitable microorganisms are those which are both tolerant of the presence of carbon dioxide and nourished by materials extractable from the reservoir oils. Examples of carbon dioxide-tolerant microorganisms include microorganisms of the genera Bacillus, Pseudomonas, Micrococcus, Arthobacter, Mycobacterium, Clostridium, Enterobacteriaceae, Sarcina, Methanococcus, Peptococcus, Serratia, Desulfovibrio, Thiobacillus, Lactobacillus, Leuconostoc, Aerobacter, and Escherichia. Suitable species within these genera include, for example, *Sarcina methanica, Methanococcus mazei, Bacillus subtilis, Serratia marcescens, Clostridium acetobutylicum,* and *Escherichia coli.* The inoculum of microorganism introduced into the reservoir will be of a size sufficient to establish a viable growth population which is self-perpetuating. The microorganism can be injected in any suitable medium, but will generally be used in an aqueous dispersion. Generally it will be desirable to inject highly-concentrated, fluid aqueous dispersions of the microorganism such as, for example, concentrations of about $10^6$–$10^9$ cells/mL.

The carbon dioxide is injected into the subterranean oil-bearing reservoir at a pressure sufficient to extract nitrogen-containing nutrients for the organisms from the oil. The pressure of the carbon dioxide can range from just above the reservoir pressure and will generally be at least about 50 psig, preferably about 500 to about 1100 psig. There must be sufficient carbon dioxide pressure to maintain sufficient nitrogen-containing compounds in solution to sustain microorganism life. The exact pressure maintained in a given reservoir will depend on a number of factors including the nutrient needs of the microorganism and the nitrogen content and type of the oil; i.e., given the same microorganism, a reservoir oil containing 0.5% nitrogen-containing compounds will require more pressure than one containing 2% nitrogen-containing compounds. The reservoir temperature should be such as to maintain water in the liquid phase and will generally be about 40° to about 160° F.

The carbon dioxide containing gas will comprise at least about 20 volume percent and preferably about 50 to 100 volume percent carbon dioxide. Up to about 5 volume percent oxygen is acceptable, but preferably not more than about 1 volume percent is present in the injected carbon dioxide gas. The injected gas can be a mixture of components which do not materially interfere with microorganism metabolism, such as a mixture of carbon dioxide and nitrogen gases.

The carbon dioxide gas can be injected prior to, subsequent to, or in combination with the microorganism. The method selected will depend upon the conditions of the reservoir. The carbon dioxide injection can precede the injection of microorganisms. In such a process, the nitrogen nutrients will already be solubilized in the reservoir water. In some reservoirs prior use of carbon dioxide as a flood or drive fluid will result in a reservoir containing carbon dioxide which can be, if necessary, repressured to solubilize nitrogen constituents of the oil.

The carbon dioxide and the microorganisms may be injected simultaneously into the reservoir. The microorganism front will then move with the carbon dioxide front so that water-soluble materials are consumed as they are extracted.

The carbon dioxide may be injected following injection of the microorganisms. In this embodiment, the formation is seeded with a culture of a species having cells which are relatively small and nonproliferating (such as spores) and thus able to penetrate in an inactive state into the formation. The carbon dioxide is then injected to extract water-soluble nutrients from the oil, resulting in rapid growth of the microorganisms.

The microorganism and carbon dioxide can be injected into an injection well and pressured toward a production well. The microorganism and carbon dioxide can also be injected into a well, closed in and maintained under pressure for an effective period of time, and then recovered via the same well. Any other methods for introducing the components of the process into the reservoir are within the scope of the invention.

After being injected into the reservoir, the carbon dioxide, maintained under a pressure of at least about 50 psig and preferably about 500 to about 1100 psig, is permitted to contact the oil. The high-pressure carbon dioxide extracts N-containing and S-containing compounds from the oil. The extracted substances will be solubilized by the carbon dioxide and/or the aqueous microorganism medium, if present. The extracted substances, in solubilized form, are available as nutrients to support the life and growth of the microorganism. Organic N- and S-containing compounds extracted into the aqueous phase also serve as a source of carbon for the microorganism, along with the methane produced from the reaction of hydrogen and carbon dioxide in the reservoir.

The time necessary for successfully carrying out the invention process varies depending upon the interaction of a number of conditions. For example, factors such as whether the reservoir is already waterflooded out, whether it was previously inoculated with microorganisms, the permeability of porosity of the reservoir, the injection rate of the aqueous medium and of the carbon dioxide, the oil viscosity, the percent oil in place and the size of the waterflood pattern all influence the rate at which the process occurs. The extraction step is relatively very rapid. The rate limiting step is the metabolism of the microorganisms to produce oil recovery enhancing substances. Generally, the microorganism must be allowed to metabolize for at least about one week before significant reduction in oil viscosity and oil/water surface tension are achieved. As an illustration, the injection of 100 gallons of an aqueous dispersion of microorganisms in a concentration of about $10^6$/cc, the microorganisms having a generation time of about 8 hours, would be expected to result in conditions permitting enhanced oil recovery in a time of 2 to 6 weeks. Depending upon well conditions, the presence of the microorganisms could affect oil recovery from the reservoir for several years following this type of treatment.

The oil being treated by the extraction process must not contain excessive amounts of carbon dioxide-extractable substances which would be detrimental to the microorganisms. For example, the extraction process will remove, in addition to desirable nitrogen-containing and sulfur-containing compounds, metal from the oil. In small quantities, certain of the metals will be beneficial to microorganism growth. However, in excessive quantities extractable metals such as lead and arsenic may be inhibitory and detrimental to microorganism growth and should not be present in excessive quantities in the oil or the formation to be treated.

The non-consumed extracted nutrients can be removed from the formation, if desired, by the removal of the water phase via a production well. The produced water containing solubilized N- and S-containing compounds and other extracted materials is returned, under pressure, to the injection well and reinjected to provide additional nutrients for the microorganisms remaining in the reservoir. If necessary, excessive quantities of metals can be removed from the water prior to reinjection.

The injected microorganism consumes the nutrienrts extracted from the oil and produces various products of metabolism including carbon dioxide methane, carboxylic acids and biopolymers. The formation of biogenic surfactants such as organic acids and sulfonated higher alcohols and esters is of particular advantage because of the effect of increasing the oil-water miscibility.

The overall process thus starts with $CO_2$ extraction of certain nitrogen- and sulfur-containing compounds from the reservoir oil. This reduces the oil viscosity and contributes to its enhanced production. The microorganisms consume the extracted nutrients and produce solvent- or surfactant-acting substances which are miscible with or soluble in the oil. This in turn causes the oil to be more receptive to additional carbon dioxide and thus to additional water extraction of nitrogen compounds, making the process in a sense self-generating. The produced oil from a reservoir in which the invention has been practiced will have reduced nitrogen and sulfur content, which has the desirable effects of causing it to be less viscous for easier production and "cleaner" for refining.

In a further embodiment of the invention, nutrients for injected microorganisms are obtained by treating a produced oil and water emulsion with carbon dioxide under pressure, such as about 500–100 psig, to extract nitrogen- and sulfur-containing compounds from the oil, removing under pressure the nutrient-containing water from the oil, and injecting the nutrient-containing water phase back into the reservoir to stimulate microorganism growth. If a high concentration of extractives is achieved and injected, the extractive serves the multiple functions of surfactant, nutrient and biocide. The injection of the highly-concentrated extractive inhibits growth of the microorganisms near the well bore, which is desirable to prevent plugging of the bore. As the extractives penetrate into the formation, they are diluted, their biocidal properties are lost, and they function as nutrients for the microorganism. The microorganism is forced through the reservoir with a fluid drive such as water or $CO_2$.

It is within the scope of the invention to add nutrients, such as molasses, to the reservoir as known in the art to supplement the extracted nutrients, accelerate the metabolism of the microorganism and to speed surfactant production.

I claim:

1. A process for the recovery of oil from an oil-bearing subterranean reservoir comprising the steps of:
   (a) injecting carbon dioxide into the oil-bearing reservoir under conditions effective for extracting sulfur- and/or nitrogen-containing compounds from the oil;
   (b) injecting an aqueous solution of at least one carbon dioxide-tolerating microorganism into the carbon dioxide-containing reservoir; and
   (c) maintaining the carbon dioxide pressure in the microorganism-containing reservoir so as to extract nitrogen- and/or sulfur-containing nutrients for microorganism growth from the oil into the aqueous solution, the microorganism growth producing surface active agents which promote the release of oil from the reservoir.

2. The process of claim 1 in which the microorganism is selected from the group consisting of Bacillus, Pseudomonas, Micrococcus, Arthobacter, Mycobacterium, Clostridium, Enterobacteriaceae, Sarcina, Methanococcus, Peptococcus, Serratia, Desulfovibrio, Thiobacillus, Lactobacillus, Leuconostoc, Aerobacter, and Escherichia.

3. The process of claim 1 in which the carbon dioxide is injected at a pressure of at least about 900 psig.

4. The process of claim 1 which further comprises the injection of a drive fluid into the reservoir, to drive the oil from the formation via a production well.

5. The process of claim 1 which further comprises producing oil from the reservoir.

6. A process for the recovery of oil from an oil-bearing subterranean reservoir comprising the steps of:
   (a) injecting into the reservoir an aqueous solution of at least one carbon dioxide-tolerating microorganism;
   (b) injecting into the reservoir carbon dioxide under a pressure greater than the reservoir pressure;
   (c) maintaining the microorganism under a carbon dioxide pressure of at least 500 psig for at least about two weeks prior to oil recovery; and
   (d) recovering oil from the reservoir.

7. The process of claim 6 in which the carbon dioxide is injected prior to the injection of the microorganism.

8. The process of claim 6 in which the carbon dioxide is injected subsequent to the injection of the microorganism.

9. The process of claim 6 in which the microorganism and the carbon dioxide are injected simultaneously.

10. The process of claim 6 in which the carbon dioxide is injected at a pressure of at least about 500 psig.

11. A process for the recovery of oil from an oil-bearing subterranean reservoir comprising the steps of:
    (a) injecting into the reservoir an aqueous solution of at least one $CO_2$-tolerating microorganism; and
    (b) injecting into the reservoir an aqueous solution of petroleum-derived, $CO_2$-extracted nutrients for the microorganisms.

12. The process of claim 11 in which the microorganisms are permitted to consume the petroleum-derived, $CO_2$-extracted nutrients thereby releasing surfactant-acting chemicals into the reservoir.

13. The process of claim 12 in which the $CO_2$-extracted nutrients are present in a concentration effective as a biocide for the microorganism.

14. The process of claim 12 which further comprises forcing the microorganisms through the reservoir with a fluid drive.

15. The process of claim 14 which further comprises producing oil from the reservoir.

* * * * *